Nov. 27, 1956  A. E. KOLBE  2,771,865
MANIFOLD SUPPORT STRUCTURE
Filed Oct. 1, 1954  2 Sheets-Sheet 1
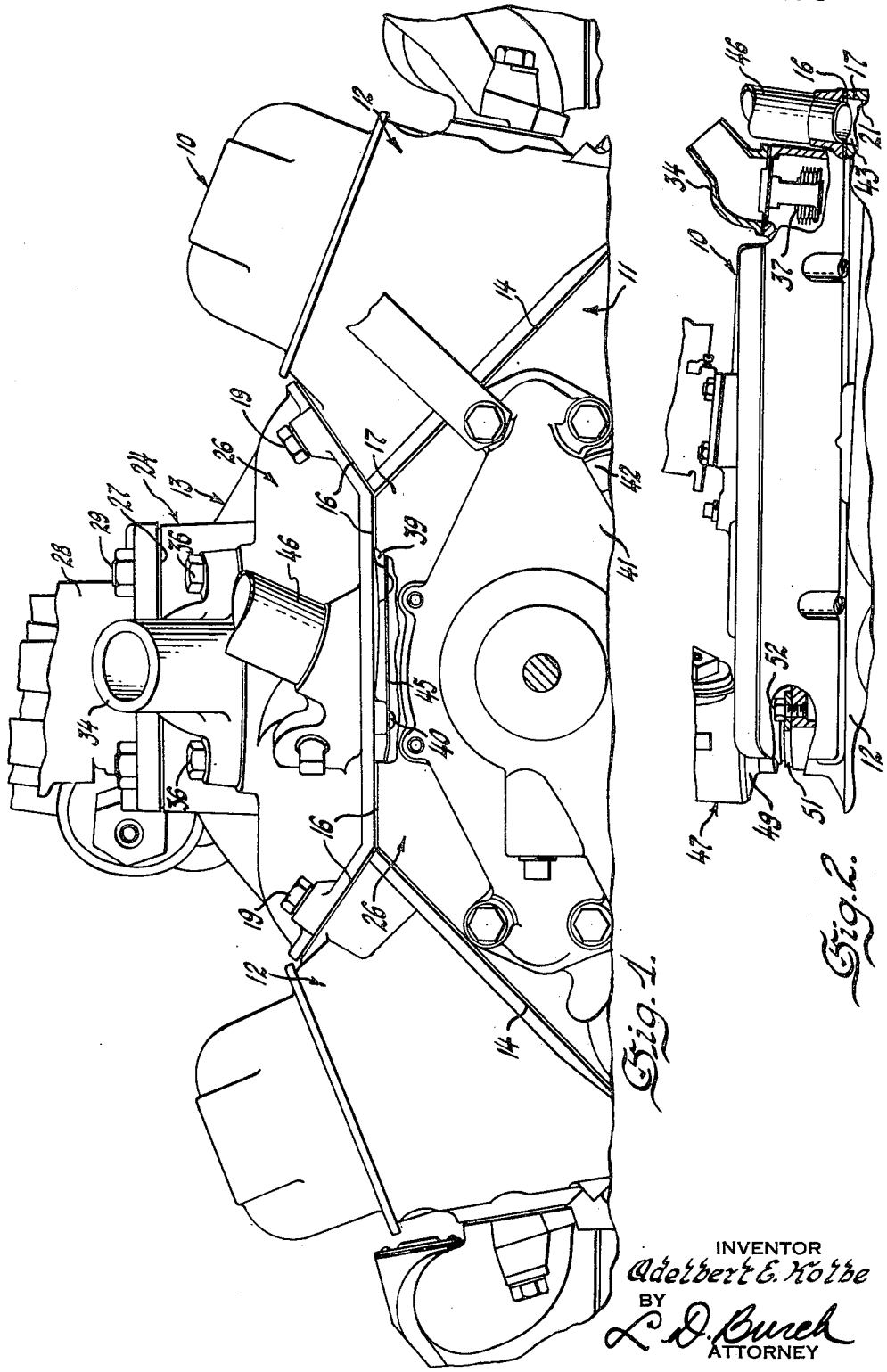
INVENTOR
Adelbert E. Kolbe
BY
L. D. Burch
ATTORNEY

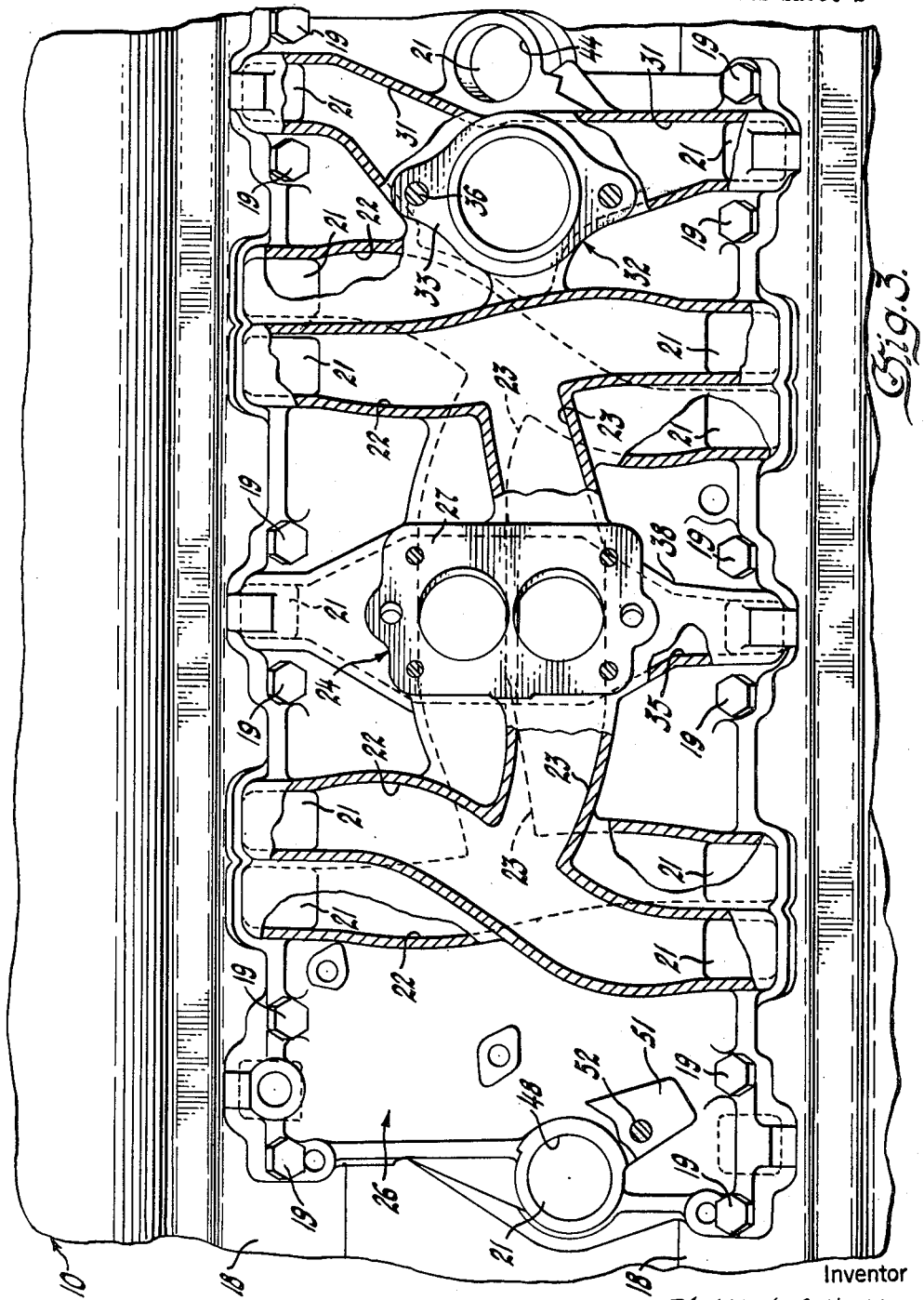

United States Patent Office 2,771,865
Patented Nov. 27, 1956

2,771,865
MANIFOLD SUPPORT STRUCTURE

Adelbert E. Kolbe, Detroit, Mich., assignor to General Motors Corporation, Detroit, Mich., a corporation of Delaware Application October 1, 1954, Serial No. 459,608

11 Claims. (Cl. 123—52)

This invention relates to internal combustion engines and has particular relation to manifold structure extending between the heads and the block of a V-type or other internal combustion engine and in which various passage means is formed and through which the various systems and operational structures within the engine are accessible.

It has been the practice heretofore to construct an engine block and then to attach thereto the engine head, the inlet manifold and other means required to operate or control the various systems and operational structures within the engine. This requires the construction of many separate units and parts which must be attached to the engine block in different locations and which require manufacturing and service methods, practices and equipment which now appear to be unsatisfactory.

It is now proposed to construct a manifold support structure which may be rigidly secured to the engine heads and block and which may form an integral part of the engine frame. It is proposed to construct the manifold structure in such a way that it will provide a separate assembly unit on which various engine components may be assembled and through which various systems and operating mechanisms within the engine may be rendered accessible for controlling and supplying and servicing the engine. The manifold structure is sealed with respect to various interior surfaces of the engine so that the engine may be controlled, supplied and serviced within the sealing means employed.

In the drawing:

Figure 1 is a fragmentary and elevational view of the upper part of a V-type internal combustion engine having a manifold structure embracing the features of the invention.

Figure 2 is a fragmentary side elevation on a reduced scale of the upper part of the engine illustrated by Figure 1.

Figure 3 is a plan view of the manifold structure embraced in the engine illustrated by Figures 1 and 2 with parts thereof broken away and shown in cross-section and parts removed from the structure to better illustrate the features of the invention.

The engine 10 embracing the invention comprises an engine block 11, engine heads 12 secured to the block 11 and manifold structure 13 secured upon the heads 12 and the block 11. Sealing means 14 may be employed in securing the heads 12 to the block 11 for providing a fluid tight seal therebetween. Sealing means 16 also may be employed between the manifold support structure 13 and the heads 12 and the block 11 for providing a fluid tight seal therebetween. The sealing means 16 may comprise oppositely disposed finished surfaces formed on the manifold structure 13, the heads 12 and the block 11 and between which surfaces suitable gasket means may be employed if such is desired. The sealing means 16 is adapted to extend across the ends 17 of the block 11 and across the adjacent sides 18 of the heads 12. On the adjacent sides 18 of the heads 12 it is proposed to extend the sealing means 16 outwardly in remote relation to the inner edges of the heads 12 so that various interior surfaces embraced in the heads 12 and accessible from the adjacent sides 18 of the heads 12 will be enclosed within the sealing means 16. It is proposed to construct the ends 17 of the block 11 and the adjacent sides 18 of the heads 12 so that the sealing surfaces thereof face outwardly of the engine to facilitate removal and installation of the manifold structure 13 without removing the heads 12 from the block 11. Also the manifold structure may be removed or installed simply by raising or lowering the structure with respect to the outwardly facing surfaces formed on the sides of the heads 12 and the ends of the block 11. The manifold structure 13 may be secured to the heads 12 and the block 11 to apply the required pressure to the sealing means 16 by employing bolts indicated at 19. In the present instance the bolts 19 are arranged in a single row on the adjacent sides of each of the heads 12 and secure the manifold structure 13 to the heads 12 in such a way as to simultaneously apply pressure to the end walls of the block 11. The sealing means 16 extends continuously around the manifold structure 13 to enclose various interiorly disposed surfaces and devices that contribute to the operation of the engine. These include the various interior surfaces indicated generally at 21 which embrace the crankcase ventilation system, the lubricating system, the cooling system, the intake and exhaust system, the ignition system, the camshaft gallery, the engine crankcase, the timing gear housing, etc.

Forming a part of the interior surfaces 21 of the engine are inlet passages formed in the heads 12 which extend between the combustion chambers of the engine and branch passage means 22 and main distribution passage means 23 forming the intake manifold 24. The passage means 22 and 23 forming the intake manifold 24 are within metallic body 26 on which the manifold structure 13 is assembled. It is considered preferable to cast the body 26 although the body may be made in any suitable manner desired. The manifold 24 terminates in a flange 27 to which the carburetor 28 of the engine may be secured by bolts 29.

The interior surfaces 21 of the engine also may include the cooling liquid cavities formed within the heads 12 and the block 11 and which terminate in openings formed in the adjacent side walls 18 of the heads 12. The openings in the side walls 18 are adapted to communicate with the radiator of the engine through passage means 31 formed in the body 26 and providing the cooling liquid manifold 32. The cooling liquid manifold 32 is provided with a flange 33 on which an outlet coupling 34 may be secured by bolts 36. Engine thermostat 37 may be secured between the coupling 34 and the manifold 32 for controlling the flow of cooling liquid from the engine.

The interior surfaces 21 of the engine also may include one or more of the exhaust passages formed in the heads 12 and which may communicate with heating passage means 35 forming a heating manifold 38 within the body 26. The heating passage means 35 may be formed to extend beneath the main distribution passage means 23 or any other part of the passage means 22 and 23 forming the inlet manifold 24. The heating manifold 38 is adapted to heat the inlet manifold 24 for conditioning the combustible mixture employed in operating the engine.

While the sealing means 16 is adapted to extend around the outside of the ports formed in the adjacent side walls 18 of the heads 12 for sealing the interior surfaces 21 with which the passage means 31, 22 and 35 communicate, it is also considered desirable to have the sealing means 16 extend entirely around each of these ports to prevent leakage between the cooling system, the induction system and the exhaust system of the engine. The sealing means 16 therefore may extend over as much of the adjacent sides 18 of the heads 12 as may be required to surround and to extend outwardly beyond the ports in the side walls 18 and in which the interior surfaces 21 forming these systems terminate.

The interior surfaces 21 of the engine also include the surfaces forming the camshaft gallery which extend within the block 11 between the front and rear walls 17 of the block 11 and between the side walls 18 of the heads 12. The interior surfaces 21 also include the crankcase of the engine which extends beneath and communicates with the camshaft gallery 39 and in which an oil sump forming a part of the lubricating system for the engine may be provided. The front wall of the engine supports a cooling liquid circulating pump 41 which extends outwardly around a timing chain cover 42. The timing chain cover 42 provides a timing chain compartment 43, the lower part of which may communicate with the crankcase of the engine and in turn with the camshaft gallery 39 and therefore is included as a part of the interior surfaces 21 of the engine. The upper part of the timing chain compartment 43 opens through a part of the sealing means 16 extending across the front wall of the engine and into passage means 44 formed in such a way as to extend through the front end 44 of the body 26 and within an outer part of the sealing means 16. The passage means 44 provides an opening in which a tube 46 may be secured and through which lubricating oil and air may be supplied to the interior of the engine. The lubricating oil may flow through the timing chain compartment 43 and into the crankcase where the oil will be collected in the crankcase sump and thereafter circulated throughout the lubricating system of the engine. The air also may flow through the timing chain compartment 43 and into the lower part of the crankcase to be circulated throughout the crankcase and exhausted through the camshaft gallery 39 through any suitable passage extending through the rear or other wall of the engine. A suitable cap and air filter may be applied to the upper end of the tube 46 if this is considered desirable.

The interior surfaces 21 of the engine also include a part of the camshaft gallery 39 in which the camshaft for the engine is mounted in the block 11. The camshaft is adapted to drive the distributor 47 for controlling the ignition system of the engine. The distributor 47 has a shaft adapted to extend through passage means 48 formed in the body 26 and opening into the interior surface 21 of the engine in which the driving means for the distributor shaft is located. The passage means 48 may extend through the sealing means 16 on the rear wall of the engine to seal the upper part of the passage in which the distributor shaft is located from the upper part of the camshaft gallery of the engine. This may be done to facilitate lubrication of the distributor shaft and the driving means for the distributor shaft and the timing mechanism for the engine. The casing 49 for the distributor 47 may be secured to the manifold structure 13 by a fastening plate 51 secured to the body 26 by a bolt 52.

In the present instance the crankcase ventilation system employs a baffle 45 which may be secured to the lower part of the body 26 by screws 40. The baffle 45 may be removed from the engine when the manifold structure 13 is removed thus completely opening the top of the camshaft gallery 39 so that the camshaft and other parts within the interior of the engine are readily accessible.

In order to insure that any leakage of combustible mixture, exhaust gas or cooling liquid which may occur between the manifold structure 13 and the side walls 18 of the heads 12 will be outwardly rather than inwardly of the engine, it is proposed to construct the side walls 18 of the heads 12 and the oppositely disposed and engaging surfaces of the manifold structure 13 in such manner that the surfaces diverge outwardly to a slight extent from the inner edges of the side walls 18. This may be done in any desired manner as for example by making the side surfaces 18 at 34° and 50' plus or minus 10' and the oppositely disposed surfaces of the manifold structure 13 at 35° and 10' plus or minus 10'. With the surfaces formed in this manner it will be apparent that the greatest possible manufacturing error can result only in the surfaces either being parallel or farther apart as they extend outwardly from the inner edges of the heads 12. This will cause the forces employed in sealing the surfaces to be as great or greater at all times at the inner edges of the surfaces than elsewhere throughout the surfaces. Hence if there is any leakage of cooling liquid, exhaust gas or combustible mixture due to manufacturing inaccuracies affecting these surfaces the leakage will always be outwardly rather than inwardly of the engine.

The fact that all of the passage means formed in the manifold structure 13 may extend through the sealing means 16 either upon the side walls of the heads 12 or upon the front and rear walls 17 of the block 11 also insures against leakage of fluid between the various fluid systems involved in operating the engine.

It will be apparent that the structure embodying the invention will greatly facilitate the manufacture and service of the engine. In manufacturing the engine it will be possible to assemble the carburetor, the distributor, the engine thermostat and the crankcase filler tube all upon the body 26 before the manifold structure is assembled upon the engine. This will permit a better distribution of manpower on the floor space available for manufacturing the engine and will greatly contribute to the production of the engine in large quantities and at low cost.

Also it will be easier to service the engine inasmuch as it is possible to gain immediate access to the interior of the engine merely by removing the manifold structure 13 as a complete and fully assembled unit. It will be possible then to service the interior of the engine and the assembled elements supported by the body 26 in different places in the service room and by the use of different service tools and manpower.

The structure may be easily assembled and removed from the engine merely by inserting or removing the bolts 19.

The claims:
1. A manifold structure for an internal combustion engine having spaced and oppositely disposed pairs of heads and a block on which said heads are mounted and having sealing means formed on said heads and said block and facing outwardly of said engine and comprising a continuous body having passage means formed therein and adapted to open into the interior of said engine, said body having sealing means formed thereon in opposed relation to said sealing means on said heads and said block, said sealing means on said body and said heads and said block being formed to extend in opposed and engaging relation along the adjacent sides of said heads and in spaced relation to the inner edges thereof and across the ends of said block and continuously around the outer edges of said body and enclosing the outwardly opening interior surfaces formed on and within said heads and said block, and means for securing said body against said heads and said block and upon said sealing means of said heads and said block and limiting access to said interior surfaces of said heads and said block to said passage means in said body.

2. A manifold structure for an internal combustion engine as defined by claim 1 and in which said passage means in said body comprises inlet manifold means adapted to communicate through said interior surfaces with inlet passages formed in said heads.

3. A manifold structure for an internal combustion engine as defined by claim 1 and in which said passage means in said body comprises cooling liquid manifold means adapted to communicate through said interior surfaces with cooling liquid passages formed in said heads and said block.

4. A manifold structure for an internal combustion engine as defined by claim 1 and in which said passage means in said body comprises a passage leading to said interior surfaces and communicating with the lubricating system of said engine and being adapted to supply lubricating oil to said engine.

5. A manifold structure for an internal combustion engine as defined by claim 1 and in which said passage means in said body comprises a passage leading to said interior surfaces and communicating with the interior ventilation system for said engine and being adapted to supply air for ventilating said engine.

6. A manifold structure for an internal combustion engine as defined by claim 1 and in which said passage means in said body comprises an opening leading to said interior surfaces and in which the distributor of said engine is adapted to be mounted.

7. A manifold structure for an internal combustion engine as defined by claim 1 and in which said passage means in said body comprises an opening leading to said interior surfaces and in which the distributor of said engine is adapted to be mounted, and means disposed on said body for mounting said distributor on said body.

8. A manifold structure for an internal combustion engine as defined by claim 1 and in which said passage means comprises a heating passage for supplying heating fluid from said engine to said body for heating said body.

9. A manifold structure for an internal combustion engine as defined by claim 1 and in which said body is formed to provide inlet manifold means for said engine and in which said passage means comprises a heating passage for supplying heating fluid from said engine to said body for heating said inlet manifold means.

10. A manifold structure for an internal combustion engine as defined by claim 1 and in which said adjacent sides of said heads and the oppositely disposed sides of said body and on which said sealing surfaces are formed on said heads and said body are disposed obliquely to the extent of a few thousandths of an inch to provide angularly disposed engaging surfaces diverging outwardly from said inner edges of said heads and forming sealing means under pressures as great or greater at the inner than at the outer edges of said heads.

11. A manifold structure for an internal combustion engine as defined by claim 1 and in which said body forms a part of the engine frame and is rigidly secured to said heads and said block for increasing the rigidity of said block and adding thereto the structural strength embraced in said heads and said body.

References Cited in the file of this patent

UNITED STATES PATENTS

| | | |
|---|---|---|
| 1,285,129 | Goodrich | Nov. 19, 1918 |
| 2,603,199 | Moseley | July 15, 1952 |
| 2,686,506 | Carpentier et al. | Aug. 17, 1954 |